United States Patent
Pittman et al.

(10) Patent No.: US 7,739,543 B1
(45) Date of Patent: Jun. 15, 2010

(54) SYSTEM AND METHOD FOR TRANSPORT-LEVEL FAILOVER FOR LOOSELY COUPLED ISCSI TARGET DEVICES

(75) Inventors: Joseph C. Pittman, Apex, NC (US); Mohan Srinivasan, Cupertino, CA (US); Herman Lee, Mountain View, CA (US); Brian Pawlowski, Palo Alto, CA (US); Arthur F. Lent, Cambridge, MA (US); Vijayan Rajan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 757 days.

(21) Appl. No.: 10/421,552

(22) Filed: Apr. 23, 2003

(51) Int. Cl.
G06F 11/00 (2006.01)

(52) U.S. Cl. .............................. 714/7; 714/11; 714/13; 714/57; 709/208

(58) Field of Classification Search .................. 714/4, 714/7, 11, 13, 57, 738; 709/208, 227, 228
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,163,131 A | 11/1992 | Row et al. | |
| 5,355,453 A | 10/1994 | Row et al. | |
| 5,485,579 A | 1/1996 | Hitz et al. | |
| 5,633,999 A | 5/1997 | Clowes et al. | |
| 5,668,943 A * | 9/1997 | Attanasio et al. | 714/7 |
| 5,752,257 A * | 5/1998 | Ripoll et al. | 711/114 |
| 5,781,770 A | 7/1998 | Byers et al. | |
| 5,790,775 A * | 8/1998 | Marks et al. | 714/9 |
| 5,802,366 A | 9/1998 | Row et al. | |
| 5,812,748 A | 9/1998 | Ohran et al. | |
| 5,812,751 A | 9/1998 | Ekrot et al. | |
| 5,819,292 A | 10/1998 | Hitz et al. | |
| 5,917,997 A * | 6/1999 | Bell et al. | 714/4 |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,951,695 A | 9/1999 | Kolovson | |
| 5,963,962 A | 10/1999 | Hitz et al. | |
| 6,038,570 A | 3/2000 | Hitz et al. | |
| 6,038,677 A * | 3/2000 | Lawlor et al. | 714/4 |
| 6,065,037 A | 5/2000 | Hitz et al. | |

(Continued)

OTHER PUBLICATIONS

Wikipedia, Mac address, http://en.wikipedia.org/wiki/MAC_address.*

(Continued)

*Primary Examiner*—Scott T. Baderman
*Assistant Examiner*—Loan Truong
(74) *Attorney, Agent, or Firm*—Cesari and McKenna LLP

(57) ABSTRACT

A system and method for clustered failover of storage appliances is provided. In the event of a failover of one storage appliance to a surviving storage appliance, the surviving storage appliance assumes the identity of the failed storage appliance. This assumption of the identifier is accomplished by activating a network interface controller or host bus adapter with a network address associated with the failed storage appliance and by mapping a iSCSI name from the failed storage appliance to the surviving storage appliance.

19 Claims, 6 Drawing Sheets

U.S. PATENT DOCUMENTS

| | | | | |
|---|---|---|---|---|
| 6,105,151 | A * | 8/2000 | Mahalingam et al. | 714/48 |
| 6,119,244 | A | 9/2000 | Schoenthal et al. | |
| 6,138,126 | A | 10/2000 | Hitz et al. | |
| 6,178,520 | B1 * | 1/2001 | DeKoning et al. | 714/5 |
| 6,209,023 | B1 * | 3/2001 | Dimitroff et al. | 709/211 |
| 6,289,356 | B1 | 9/2001 | Hitz et al. | |
| 6,292,905 | B1 | 9/2001 | Wallach et al. | |
| 6,314,525 | B1 * | 11/2001 | Mahalingham et al. | 714/4 |
| 6,360,331 | B2 * | 3/2002 | Vert et al. | 714/4 |
| 6,425,035 | B2 | 7/2002 | Hoese et al. | |
| 6,467,049 | B1 * | 10/2002 | Robins et al. | 714/13 |
| 6,578,158 | B1 * | 6/2003 | Deitz et al. | 714/11 |
| 6,594,775 | B1 * | 7/2003 | Fair | 714/4 |
| 6,609,213 | B1 * | 8/2003 | Nguyen et al. | 714/4 |
| 6,625,747 | B1 * | 9/2003 | Tawil et al. | 714/6 |
| 6,625,749 | B1 | 9/2003 | Quach | |
| 6,640,314 | B1 * | 10/2003 | Lelaure et al. | 714/11 |
| 6,715,098 | B2 * | 3/2004 | Chen et al. | 714/3 |
| 6,718,481 | B1 * | 4/2004 | Fair | 714/4 |
| 6,718,482 | B2 * | 4/2004 | Sato et al. | 714/4 |
| 6,725,394 | B1 * | 4/2004 | Bolt | 714/7 |
| 6,728,897 | B1 | 4/2004 | Cramer et al. | |
| 6,775,702 | B2 | 8/2004 | Oeda et al. | |
| 6,865,157 | B1 * | 3/2005 | Scott et al. | 370/242 |
| 6,865,617 | B2 * | 3/2005 | Zeidner et al. | 710/3 |
| 6,885,633 | B1 * | 4/2005 | Mikkonen | 370/217 |
| 6,920,579 | B1 * | 7/2005 | Cramer et al. | 714/4 |
| 6,934,880 | B2 * | 8/2005 | Hofner | 714/10 |
| 6,971,044 | B2 * | 11/2005 | Geng et al. | 714/11 |
| 6,980,510 | B1 * | 12/2005 | Deitz et al. | 370/217 |
| 7,039,827 | B2 * | 5/2006 | Meyer et al. | 714/4 |
| 7,055,056 | B2 * | 5/2006 | Bessire | 714/6 |
| 7,085,883 | B1 * | 8/2006 | Dalgic et al. | 711/114 |
| 7,159,140 | B2 * | 1/2007 | Greco et al. | 714/7 |
| 7,260,737 | B1 * | 8/2007 | Lent et al. | 714/5 |
| 2001/0048661 | A1 * | 12/2001 | Clear et al. | 370/218 |
| 2002/0112022 | A1 | 8/2002 | Kazar et al. | |
| 2002/0116593 | A1 | 8/2002 | Kazar et al. | |
| 2002/0133746 | A1 * | 9/2002 | Chen et al. | 714/13 |
| 2002/0144177 | A1 * | 10/2002 | Kondo et al. | 714/13 |
| 2003/0018927 | A1 * | 1/2003 | Gadir et al. | 714/4 |
| 2003/0037282 | A1 * | 2/2003 | Berg et al. | 714/11 |
| 2003/0041287 | A1 * | 2/2003 | Kazar | 714/37 |
| 2003/0061319 | A1 * | 3/2003 | Manzardo | 709/221 |
| 2003/0126347 | A1 * | 7/2003 | Tan et al. | 710/313 |
| 2003/0131182 | A1 * | 7/2003 | Kumar et al. | 711/5 |
| 2003/0163592 | A1 * | 8/2003 | Odenwald | 709/250 |
| 2003/0188233 | A1 * | 10/2003 | Lubbers et al. | 714/100 |
| 2003/0237018 | A1 * | 12/2003 | Baba | 714/4 |
| 2004/0010563 | A1 * | 1/2004 | Forte et al. | 709/215 |
| 2004/0081087 | A1 * | 4/2004 | Shea | 370/228 |
| 2004/0153693 | A1 * | 8/2004 | Fisher et al. | 714/4 |
| 2004/0205388 | A1 * | 10/2004 | Nakano | 714/11 |
| 2005/0033804 | A1 * | 2/2005 | Iwami et al. | 709/203 |

OTHER PUBLICATIONS

U.S. Appl. No. 09/933,866, Samuel M. Cramer et al.
U.S. Appl. No. 09/933,883, Samuel M. Cramer et al.
U.S. Appl. No. 10/027,020, Joydeep Sen Sarma et al.
U.S. Appl. No. 10/216,453, Vijayan Rajan et al.
U.S. Appl. No. 10/215,917, Brian Pawlowski et al.
David Hitz et al. TR3002 File System Design for a NPS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
NCI TS 332-1999 Fibre Channel Arbitrated Loop (FC-AL-2) published by the American National Standards Institute.
ANSI X3.230-1994, Fibre Channel Physical and Signaling Interface (PC-PH).
Request for Comments (RFC) 826: An Ethernet Address Resolution Protocol, published by the Internet Engineering Task Force (IETF).
iSCSI, IPS Internet Draft, Julian Satran et al., IBM, Cisco Systems, Hewlett-Packard Co. SANGate, Aug. 5, 2002.
LUN Masking in a SAN, Bill King, QLogic Corporation, Jun. 2001.
Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.
Anupam Bhide, Elmootazbellah N. Elnozahy, Stephen P. Morgan, "A Highly Available Network File Server," Proceedings of the Winter 1991 USENIX Conference, Jan. 21-25, 1991, pp. 199-205.

* cited by examiner

SYSTEM AND METHOD FOR TRANSPORT-LEVEL FAILOVER FOR LOOSELY COUPLED ISCSI TARGET DEVICES

RELATED APPLICATIONS

This application is related to the following United States Patent Applications:

Ser. No. 09/933,883 entitled NEGOTIATED GRACEFUL TAKEOVER IN A NODE CLUSTER, by Samuel M. Cramer et al., Ser. No. 09/933,866 entitled OPERATOR INITIATED GRACEFUL TAKEOVER IN A NODE CLUSTER, by Samuel M. Cramer et al.

Ser. No. 09/625,234 entitled NEGOTIATING TAKEOVER IN HIGH AVAILABILITY CLUSTER by Samuel M. Cramer, et al., which applications are hereby incorporated by reference.

FIELD OF THE INVENTION

The present invention relates to clustered storage systems and, in particular, to clustered failover in storage systems utilizing a block access protocol, such as iSCSI.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including a storage operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level access to files and file systems. Storage of information on a NAS system is typically deployed over a computer network comprising a geographically distributed collection of interconnected communication links, such as Ethernet, that allow clients to remotely access the information (files) stored on the file server. The clients typically communicate with the filer by exchanging discrete frames or packets of data according to pre-defined protocols, such as the well-known Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the well-known Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

Conversely, a SAN is a high-speed network that enables establishment of direct connections between a storage system and its storage devices. The SAN may thus be viewed as an extension to a storage bus and, as such, a storage operating system of the storage system enables access to stored information using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

It is advantageous for the services and data provided by a storage system such as a filer, to be available for access to the greatest degree possible. Accordingly, some computer storage systems provide a plurality of file servers (or filers) in a cluster, with a property that when a first filer fails, the second filer is available to take over and provide the services and the data otherwise provided by the first filer. When a first filer fails, the second filer in a cluster assumes the task of processing and handling any data access requests normally processed by the first filer. One such example of a cluster configuration is described in U.S. patent application Ser. No. 09/625,234 entitled NEGOTIATING TAKEOVER IN HIGH AVAILABILITY CLUSTER by Samuel M. Cramer, et al., the contents of which are hereby incorporated by reference.

In certain known file server cluster implementations, the transport medium is Ethernet cabling utilizing the TCP/IP protocol for transport of data. Various file service protocols can execute on top of the TCP/IP protocol, such CIFS or NFS. In known failover techniques involving clusters of filers, Network Interface Controllers (NIC) contain the capabilities to support multiple Media Access Control (MAC) addresses. When one of the file servers in a cluster detects a failure of its partner file server, for example, by sensing the partner file server is no longer emitting a heart beat signal, the surviving file server proceeds to take over the partner's disks. The surviving file server then executes a failover script, which involves obtaining the IP address of the failed file server and determining each MAC address associated with the failed file server. Each NIC on the surviving file server is then assigned a MAC address that was normally associated with a NIC of the failed file server. Thus, transfers with IP addresses which are mapped to a MAC address of the failed file server, are no longer routed to the failed file server, but instead are directed to the surviving partner file server.

However, in accordance with the iSCSI specification, each device attached to an iSCSI network requires an iSCSI name, which is unique within a given operating environment. Using conventional failover techniques, such as those described above, an iSCSI client will not properly failover to a surviving partner file server as the iSCSI name of the surviving partner file server will not be identical to that of the failed file server. As the surviving partner file server does not have the proper iSCSI name, clients of the failed file server will not have their data access requests properly routed to the surviving partner file server. In addition to the iSCSI name, the surviving file server must also have several other blocks of data for it to be able to transparently operate on the failed file server's behalf This additional data includes the LUN maps/masks associated with the failed filer for use during processing of data access requests and various types of iSCSI security information may include, for example, a list of which iSCSI initiators which may communicate with the failed target and what methods of authentication the target required. Instead, an error condition may occur as the iSCSI name or other information is not associated with the same device as the network address to which the client is directing data access requests.

It is thus an object of the present invention to provide a system and method for transport-level failover of iSCSI devices.

SUMMARY OF THE INVENTION

This invention overcomes the disadvantages of the prior art by providing a system and method for transport-level failover of iSCSI devices, such as storage systems, in a cluster operating on a TCP/IP network. The cluster comprises a plurality of storage system embodied as multi-protocol storage appliances interconnected by a cluster interconnect device. Each storage appliance is coupled to a plurality of disks. Upon failure of one of the storage appliances, the surviving storage appliance assumes the identity of the failed storage appliance by activating a network interface controller (NIC) with a network address normally associated with the failed storage appliance. The surviving storage appliance also activates and maps an iSCSI name to the NIC. This newly mapped iSCSI name is also normally associated with the failed storage appliance. Thus, data access requests directed to the failed storage appliance will be received by the surviving partner storage appliance. The surviving storage appliance then takes ownership of the disks that were owned by the failed storage appliance. This ownership transfer is ultimately accomplished using conventional disk ownership routines.

By assuming the network address and iSCSI name of the failed storage appliance, the partner storage appliance becomes, from a client's perspective, the failed storage appliance. Once the network address and iSCSI name have been associated with a NIC or host bus adapter (HBA) on the surviving storage appliance, data access requests that were normally directed to the failed storage appliance will be directed to the surviving partner to storage appliance. The partner storage appliance may then process the data access requests. To clients of the failed storage appliance, it appears as if the failed storage appliance was momentarily disconnected from the network and then reconnected. However, when the failed storage appliance is "reconnected," it is actually the surviving storage appliance operating on behalf of the failed storage appliance.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Cluster Environment

Figure 1:
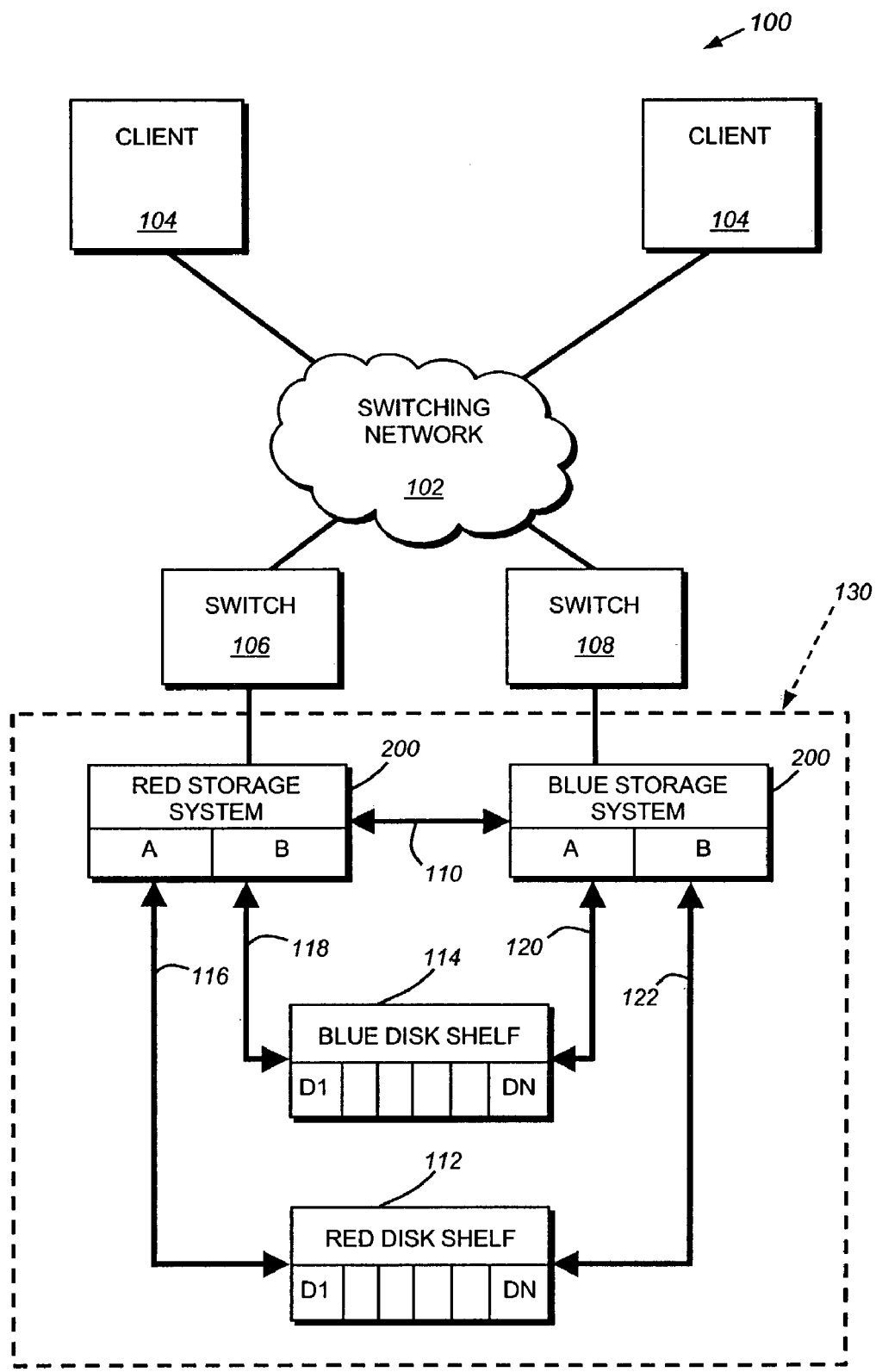
FIG. 1 is a schematic block diagram of a storage system cluster environment in accordance with an embodiment of the present invention.

FIG. 1 is a schematic block diagram of an exemplary network environment 100 in which the principles of the present invention are implemented. The network 100 is based around a network cloud 102 configured as, e.g., a TCP/IP-based network. Attached to the network cloud are a number of switches, 106 and 108, which connect to iSCSI devices, such as Red storage system and Blue storage system 200. A number of clients 104 are also interconnected with the network cloud. The network 102 is may be a local area network (LAN), wide area network (WAN), a virtual private network (VPN) or any other acceptable network arrangement.

A client 104 may be a general-purpose computer, such as a PC or a workstation, or a special-purpose computer, such as an application server, configured to execute applications over an operating system that includes block access protocols. Red storage system and Blue storage system 200 are connected as two nodes of an exemplary storage system cluster 130. These storage systems, described further below, are storage appliances configured to control storage of and access to, interconnected storage devices. Each of the devices attached to the network 102 includes an appropriate conventional network interface arrangement (not shown) for communicating over the network 102, or through the switches 106 and 108, using a set of desired block access protocols such as the Small Computer System Interface (SCSI) encapsulated TCP/IP (iSCSI).

In the illustrated example, Red storage system is connected to Red Disk Shelf 112 by data access loop 116. It should be noted that such a data access loop can be any acceptable networking media including, for example, a Fibre Channel Arbitrated Loop (FCAL). Fibre Channel is a set of related protocols that define a transport service for a variety of data access protocols. Similarly, the Red storage system accesses Blue Disk Shelf 114 via counterpart data access loop 118. Likewise, Blue storage system accesses Blue Disk Shelf 114 via data access loop 120 and Red Disk Shelf 112 through data access loop 122. It should be noted that the Red and Blue disk shelves are shown directly connected to the storage system 200 for illustrative purposes only. The disk shelves and storage systems may be operatively interconnected in any suitable network topology, including through switches or over a Local Area Network.

During normal cluster operation, the storage system that is connected to a disk shelf via the disk shelf's A loop is the "owner" of the disk shelf and is primarily responsible for servicing data requests directed to blocks or volumes contained on that disk shelf. In accordance with an exemplary embodiment, only the storage system that owns a set of disks may write to that given set of disks. Thus, in this example, the Red storage system would own the Red Disk Shelf 112 (as it is connected to the Red Disk Shelf's A Loop) and be primarily responsible for servicing data access requests blocks contained on is that disk shelf. Similarly, the Blue storage system would be primarily responsible for the Blue Disk Shelf 114. When operating as a cluster, each storage system is adapted to take over and assume data handling capabilities for the other storage system in the file system cluster 130.

Connecting the Red and Blue storage systems, in the illustrative embodiment, is a cluster interconnect 110, which provides a direct communication link between the two storage systems. The cluster interconnect may be of any suitable communication medium, including, for example, an Ethernet connection. In the illustrative embodiment, each of the storage system 200 of the storage appliance cluster 130 send to the other storage system a regularly timed "heartbeat" signal. The heartbeat signal alerts the other storage system that the transmitting storage system is operational and is not suffering from an error or other failure condition.

B. Storage Appliance

Figure 2:
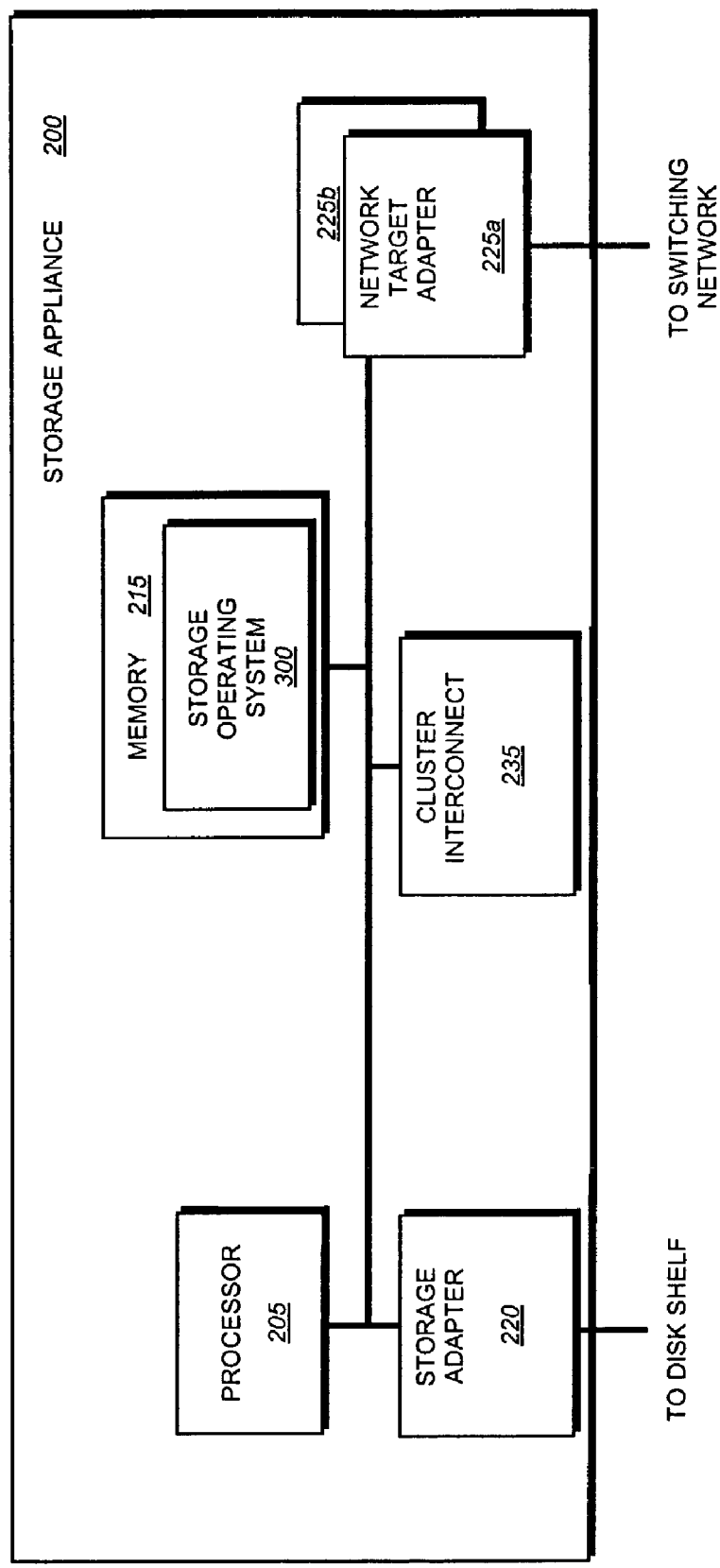
FIG. 2 is a more-detailed schematic block diagram of an exemplary storage appliance in accordance with FIG. 1.

FIG. 2 is a schematic block diagram of a storage system 200 as used in the exemplary cluster environment 100 configured to provide storage service relating to the organization of information on storage devices, such as disks. The storage system 200 is illustratively embodied as a multi-protocol storage appliance. A multi-protocol storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. Multi-protocol storage appliances are further described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., the teachings of which are hereby incorporated by reference. The terms "storage system" and "storage appliance" are herein used interchangeably. The multi-protocol storage appliance comprises a processor 205, a memory 215, a plurality of network adapters 225a, 225b and a storage adapter 220 interconnected by a system bus 230. The storage appliance 200 also includes in memory a storage operating system 300 that provides a virtualization function to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the multi-protocol storage appliance 200 presents (exports) disks to SAN clients through the creation of logical unit numbers (luns) or vdisk objects. A vdisk object (hereinafter "vdisk") is a special file type that is implemented by the virtualization function and translated into an emulated disk as viewed by the SAN clients. Exemplary vdisks objects are further described in U.S. patent application Ser. No. 10/216,453, entitled STORAGE VIRTUALIZATION BY LAYERING VIRTUAL DISK OBJECTS ON A FILE SYSTEM, by Vijayan Rajan, et al., the contents of which are incorporated herein by reference. The multi-storage appliance thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 225a and 225b couple the storage appliance to a plurality of clients over point-to-point links, wide area networks (WAN), virtual private networks (VPN) implemented over a public network (Internet) or a shared local area network (LAN) or any other acceptable form of networking architecture such as switching network 102. Therefore, the network adapter 225a and 225b may comprise a network interface card (NIC) having the mechanical, electrical and signaling circuitry needed to connect the storage appliance to a network switch, such as a conventional Ethernet switch. Alternately, the network adapter 225 may comprise an iSCSI Host Bus Adapter (HBA). An HBA is a hardware device that operates at the SCSI level by passing SCSI requests to a software driver. The HBA also performs data transfers to and from a set of buffers provided by the driver. During such data transfer operations, the HBA implements the iSCSI protocol and performs the TCP/IP and NIC functions. In an alternate embodiment, the network adapter 225 may be a TCP/IP Offload Engine (TOE). TOEs are generally described in Introduction to TCP/IP Offload Engine, Version 1.0 by Eric Yeh et al., the contents of which are hereby incorporated by reference. The clients communicate with the storage appliance over the network by exchanging discrete frames or packets of data according to pre-defined protocols, such as the Transport Control Protocol/Internet Protocol (TCP/IP).

The clients may be general-purpose computers configured to execute applications over a variety of operating systems, including the UNIX® and Microsoft® Windows™ operating systems.

These clients 104 are configured to access the information stored on the appliance 200 blocks or disks. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200. In SCSI terminology, clients 104 operating in a SAN environment are initiators that initiate requests and commands for data. The multi-protocol storage appliance is thus a target configured to respond to the requests issued by the initiators in accordance with a request/response protocol. When the underlying transport protocol is TCP/IP, clients may encapsulate SCSI protocol commands over TCP/IP to generate iSCSI commands. The iSCSI protocol is further defined in *Internet Draft: iSCSI*, Aug. 5, 2002, by Julian Satran et al., the contents of which are hereby incorporated by reference.

The storage appliance 200 supports various SCSI-based protocols used in SAN deployments, including iSCSI and SCSI encapsulated over Fibre Channel (FCP). The initiators (hereinafter clients 104) may thus request the services of the target (hereinafter storage appliance 200) by issuing iSCSI and/or FCP messages over the network 102 to access information stored on the disks. It will be apparent to those skilled in the art that the clients may also request the services of the storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes input/output (I/O) interface circuitry that couples to the disks over an I/O interconnect arrangement, such as a conventional high-performance, Fibre Channel serial link or loop topology. The information is retrieved by the storage adapter and, if necessary, processed by the processor 205 (or the adapter 220 itself) prior to being forwarded over the system bus 230 to the network adapters 225*a* and 225*b*, where the information is formatted into appropriate packets or messages for return to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID-level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with novel virtualization system code to provide a function that "virtualizes" the storage space provided by disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN storage appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file Mode that holds data and at least one associated stream Mode that holds attributes, including security information. The special file Mode functions as a main container for storing data associated with the emulated disk. The stream Mode stores attributes that allow luns and exports to persist over, e.g., reboot operations, while also enabling management of the vdisk as a single disk object in relation to SAN clients.

C. Storage Operating System

In the illustrative embodiment, the storage operating system executing on the storage appliances is the NetApp® Data ONTAP™ operating system available from Network Appliance, Inc. of Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
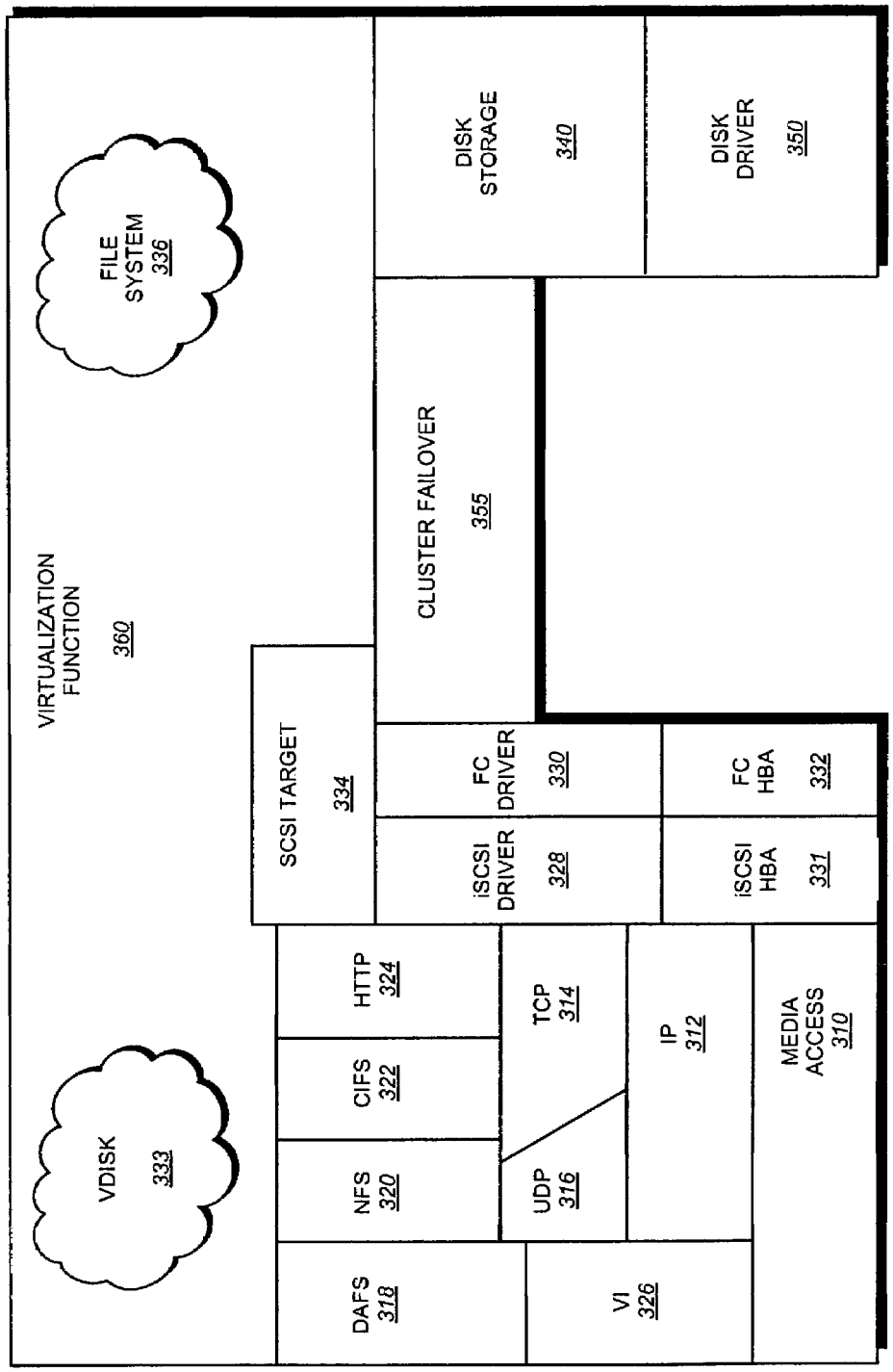
FIG. 3 is a schematic block diagram of an exemplary storage operating system for use with the exemplary storage appliance of FIG. 2 in accordance to an exemplary embodiment of the present invention.

FIG. 3 is a schematic block diagram of an exemplary storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the Internet Protocol (IP) layer 312 and its supporting transport mechanisms, the Transport Control Protocol (TCP) layer 314 and the User Datagram Protocol (UDP) layer 316. A file system protocol layer provides multi-protocol file access and, to that end, includes support for the Direct Access File System (DAFS) protocol 318, the Network File System (NFS) protocol 320, the Common Internet File System (CIFS) protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers by interacting with an iSCSI HBA 331. Similarly, a Fibre Channel (FC) driver layer 330 operates with a FC HBA 332 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization function 360 that is implemented by a file system 336 interacting with virtualization software embodied as, e.g., vdisk code 333 and SCSI target code 334. The vdisk code 333 manages SAN deployments by, among other things, implementing a comprehensive set of vdisk (lun) commands that are converted to primitive file system operations ("primitives") that interact with the file system 336 and the SCSI target code 334 to implement the vdisks.

The SCSI target code 334, in turn, initiates emulation of a disk or lun by providing a mapping procedure that translates luns into the special vdisk file types. The SCSI target code is illustratively disposed between the FC and iSCSI drivers 328, 330 and the file system 336 to thereby provide a translation layer of the virtualization function 360 between the SAN block (lun) space and the file system space, where luns are represented as vdisks.

The file system 336 illustratively implements a Write Anywhere File Layout (WAFL) file system having an on-disk format representation that is block-based using, e.g., 4 kilobyte (kB) blocks and using inodes to describe the files. A further description of the structure of the file system, is provided in U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

The virtualization function 360 provides a virtualized storage space that allows SAN and NAS storage objects to coexist with respect to global space management by the file system 336. To that end, the virtualization function 360 exploits the characteristics of the file system, including its inherent ability to aggregate disks and abstract them into a single pool of storage. For example, the function 360 leverages the ability of the file system 336 to organize a collection of disks into one or more volumes representing a pool of global storage space. The pool of global storage is then made available for both SAN and NAS deployments through the creation of vdisks and files, respectively. In addition to sharing the same global storage space, the vdisks and files share the same pool of available storage from which to draw on when expanding the SAN and/or NAS deployments.

The virtualization function 360 further provides reliability guarantees for those SAN and NAS storage objects coexisting in the global storage space of storage appliance 200. As noted, the file system 336 organizes information as file, directory and vdisk objects within volumes of disks. Underlying each volume 150 is a collection of RAID groups that provide protection and reliability against disk failure(s) within the volume. The information serviced by the multi-protocol storage appliance is protected according to an illustrative RAID 4 configuration. This level of protection may be extended to include, e.g., synchronous mirroring on the appliance platform. A vdisk 322 created on a volume that is protected by RAID 4 "inherits" the added protection of synchronous mirroring if that latter protection is specified for the volume. In this case, the synchronous mirroring protection is not a property of the vdisk but rather a property of the underlying volume and the reliability guarantees of the file system 336. This "inheritance" feature of the storage appliance simplifies management of a vdisk because a system administrator does not have to deal with reliability issues.

The storage operating system 300 further includes, in the illustrative embodiment, a cluster failover layer 355 that implements various failover features including initiating a failover. The cluster failover layer 355, monitors the cluster interconnect for heartbeat signals to determine if a cluster partner is still active or if an error condition has occurred.

D. iSCSI Failover

Figure 4:
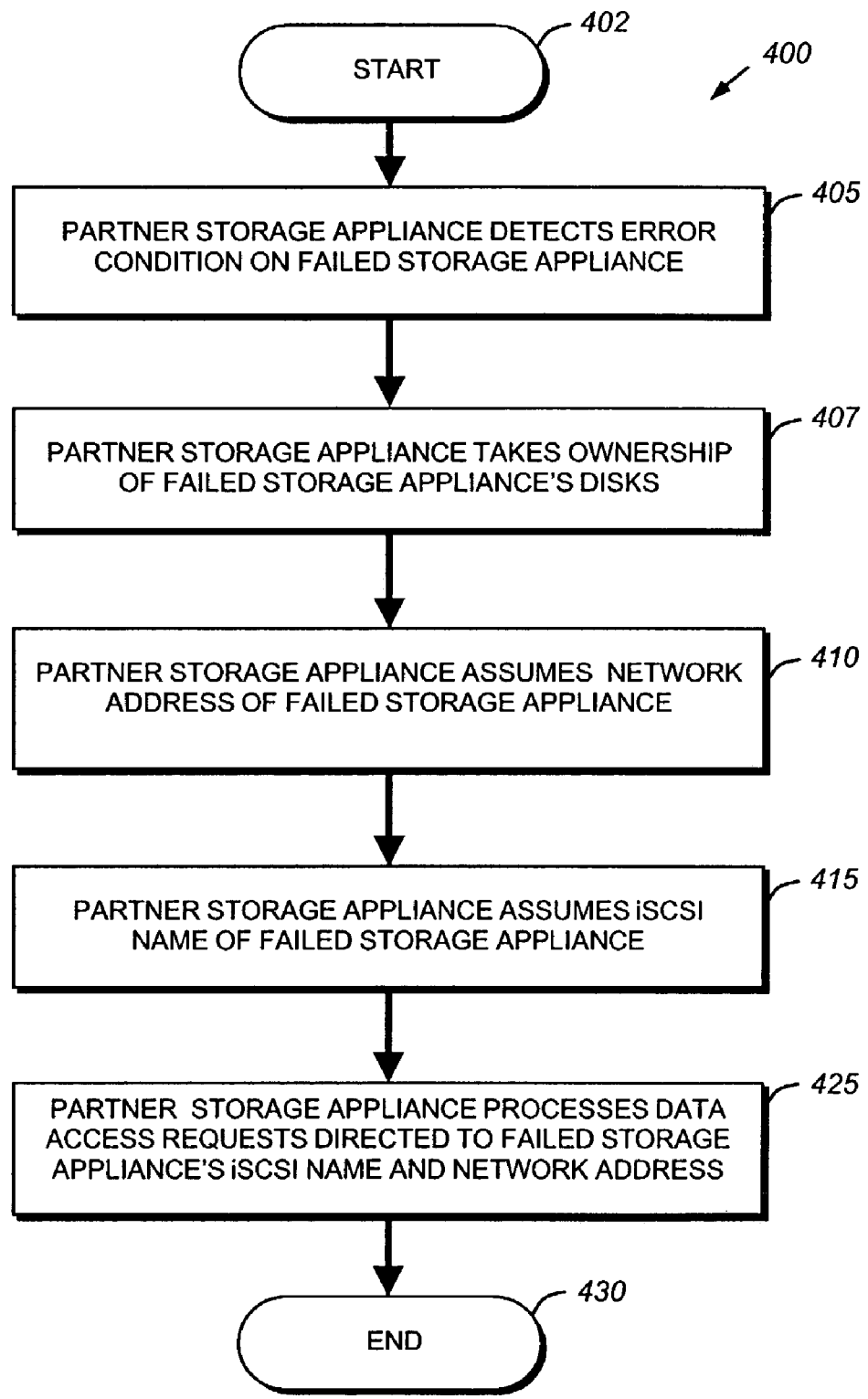
FIG. 4 is a flowchart of a procedure for transport-failover of an iSCSI connection in accordance with an embodiment of the present invention.

A flowchart showing a sequence steps of an exemplary procedure 400, for failover of iSCSI devices in a cluster is shown in FIG. 4. The sequence starts at step 402 and proceeds to step 405, when the partner storage appliance detects a failure or other error condition in the failed storage appliance. This error condition can be detected by, for example a loss of a heart beat signal over the cluster interconnect. In alternative embodiments, an administrator can initiate the failover procedure during, for example, scheduled maintenance on the storage appliance. This initiation of a failover may be accomplished by entering a command on a command line interface or by selecting an appropriate menu item in a graphical user interface.

The partner storage appliance then takes ownership of the failed storage appliances disks (step 407). This disk takeover can be accomplished using conventional disk ownership routines. One such routine is described in U.S. patent application Ser. No. 10/027,020, entitled SYSTEM AND METHOD FOR TRANSFERRING VOLUME OWNERSHIP IN NETWORKED STORAGE, by Joydeep Sen Sarma, et al., the teachings of which is hereby incorporated by reference.

The partner storage appliance, in step 410, then assumes a network address of the failed storage appliance. This assumption of a network address can be accomplished by several means. In one embodiment, the surviving or partner storage appliance identifies each media access control (MAC) address associated with the failed storage appliance. A network interface controller (NIC) connected to the partner storage appliance is then assigned a MAC address that was normally associated with a NIC on the failed storage appliance. Thus, packets addressed to the internet protocol (IP) addresses that were mapped to certain MAC addresses of the failed storage appliance are no longer routed to the failed storage appliance, but are instead directed to the surviving partner storage appliance. In another embodiment, instead of reassigning MAC addresses to the surviving partner storage appliance, a new mapping from the IP address to a MAC address associated with the surviving partner is broadcast over the network using the Address Resolution Protocol (ARP). ARP is further described in *Request for Comments*

(*RFC*) *826: Ethernet Resolution Protocol*, published by the Internet Engineering Task Force (IETF), which is hereby incorporated by reference.

If an iSCSI HBA is being utilized by the surviving partner storage appliance, then both the MAC addresses and the IP addresses of the failed storage appliance are programmed into the HBA of the surviving storage appliance.

Then, in step 415, the surviving partner storage appliance assumes the iSCSI name of the failed storage appliance. In accordance with the iSCSI standard, iSCSI names are associated with iSCSI nodes and not with iSCSI network adapter cards. In the illustrative embodiment, the iSCSI driver on the surviving storage appliance is programmed to associate the appropriate iSCSI name of the failed storage appliance with any iSCSI requests directed to the failed storage.

Once the partner storage appliance has assumed the iSCSI name of the failed storage appliance, the partner storage appliance begins servicing data access requests that were originally directed to the failed storage appliance (step 425). Clients send access to requests directed to the iSCSI name and network address associated with the failed storage appliance. However, as the surviving partner storage appliance has assumed the network identity and iSCSI name of the failed storage appliance, these data access requests will be directed to the partner storage appliance, which may then service the requests. The sequence ends at step 430.

In the exemplary embodiment, each storage appliance of a cluster maintains a set of LUN mappings and maskings for network security reasons in conjunction with the data storage environment. These LUN mappings and maskings enable the storage appliances to segment the LUNs that are not accessible or required for a particular client of the storage appliance. Thus, for example, by the use of a conventional LUN mapping or masking technique, LUNs (or vdisks) connected to a storage appliance will not appear to certain clients of the storage appliance. LUN masking allows a specific LUN to be exclusively assigned to an access by a specific list of host connections. This is accomplished by allocating the LUN to a host connection by hiding devices that are not assigned. LUN masking and mapping is well-known and further described in LUN Masking in a SAN, by Bill King, the contents of which are hereby incorporated by reference.

After a failover has occurred, the surviving partner storage appliance must perform data access operations directed to the NIC associated with the failed storage appliance's iSCSI name and network address using the failed storage appliance's LUN masking and mappings. In the illustrative embodiment each storage appliance in a cluster is configured with the LUN mapping/maskings of each other storage appliance in the cluster. This configuration is prepared by the administrator. Thus, in the event of a failover, the surviving storage appliance will have a copy of the appropriate LUN mappings/maskings of the failed storage appliance. As used herein, the term "LUN mapping" shall be taken to mean LUN mapping, LUN maskings or any combination thereof.

Figure 5:
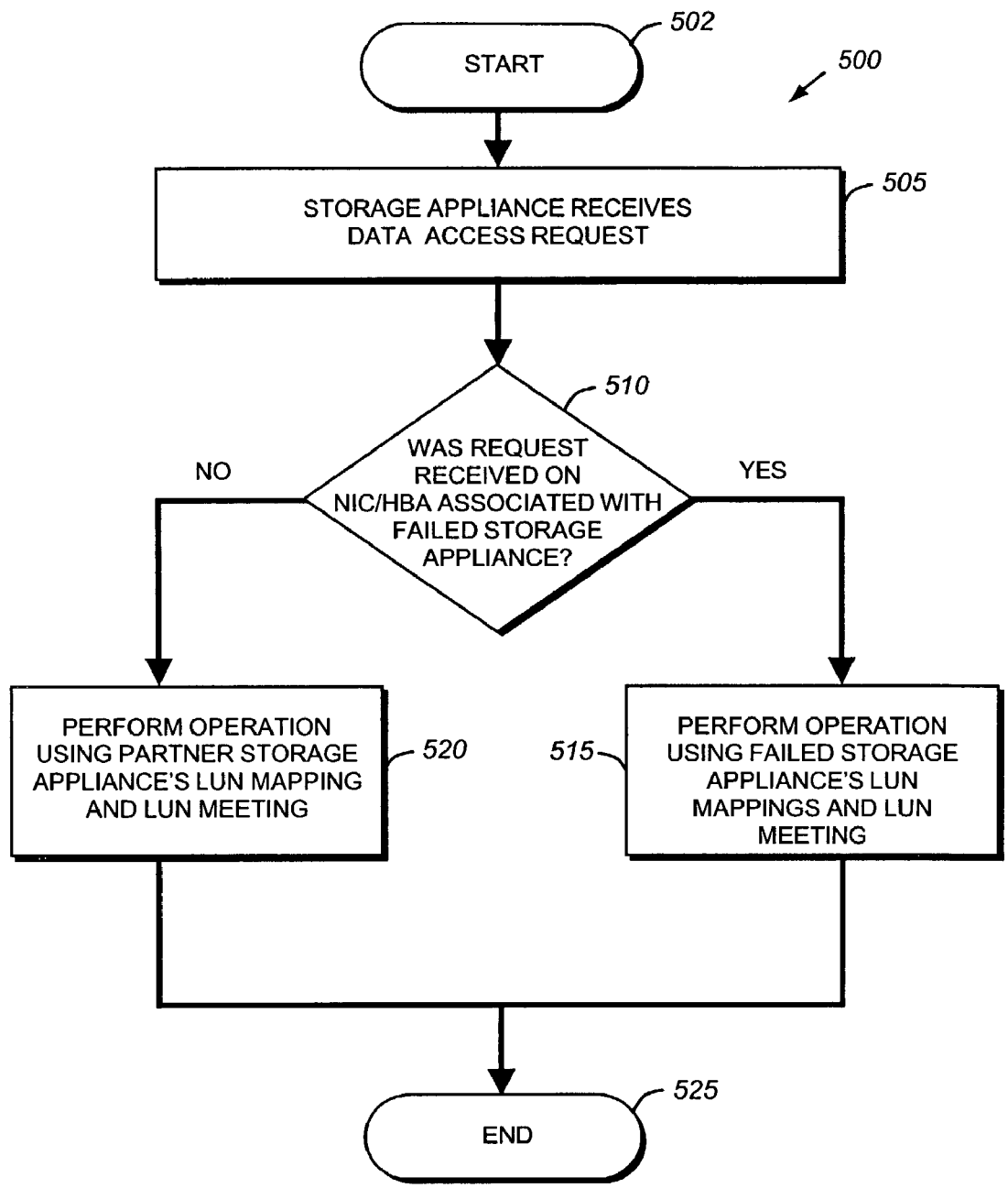
FIG. 5 is a flowchart of a procedure showing the steps performed by a surviving partner storage appliance after a failover has occurred in accordance with an embodiment of the present invention.

An exemplary flowchart of a procedure 500 for performing data access request operations during a failover is shown in FIG. 5. The procedure starts at step 502 and proceeds to step 505, where the surviving partner storage appliance receives a data access request from a client. Next, in step 510, the surviving partner storage appliance determines if the request was received on a NIC/HBA that is receiving packets associated with the failed storage appliance. This can be accomplished by, for example, determining the network address or iSCSI name to which the data access request was directed. If the data access request was received on a NIC/HBA associated with the failed storage appliance, then the storage appliance will perform the operation using the failed storage appliance's LUN mappings and LUN masking (step 515). Otherwise, the data access request was directed to a NIC/HBA associated with the surviving storage appliance, in which case, the partner storage appliance will perform the operation using its LUN mapping and LUN masking (step 520). The procedure ends at step 525.

Figure 6:
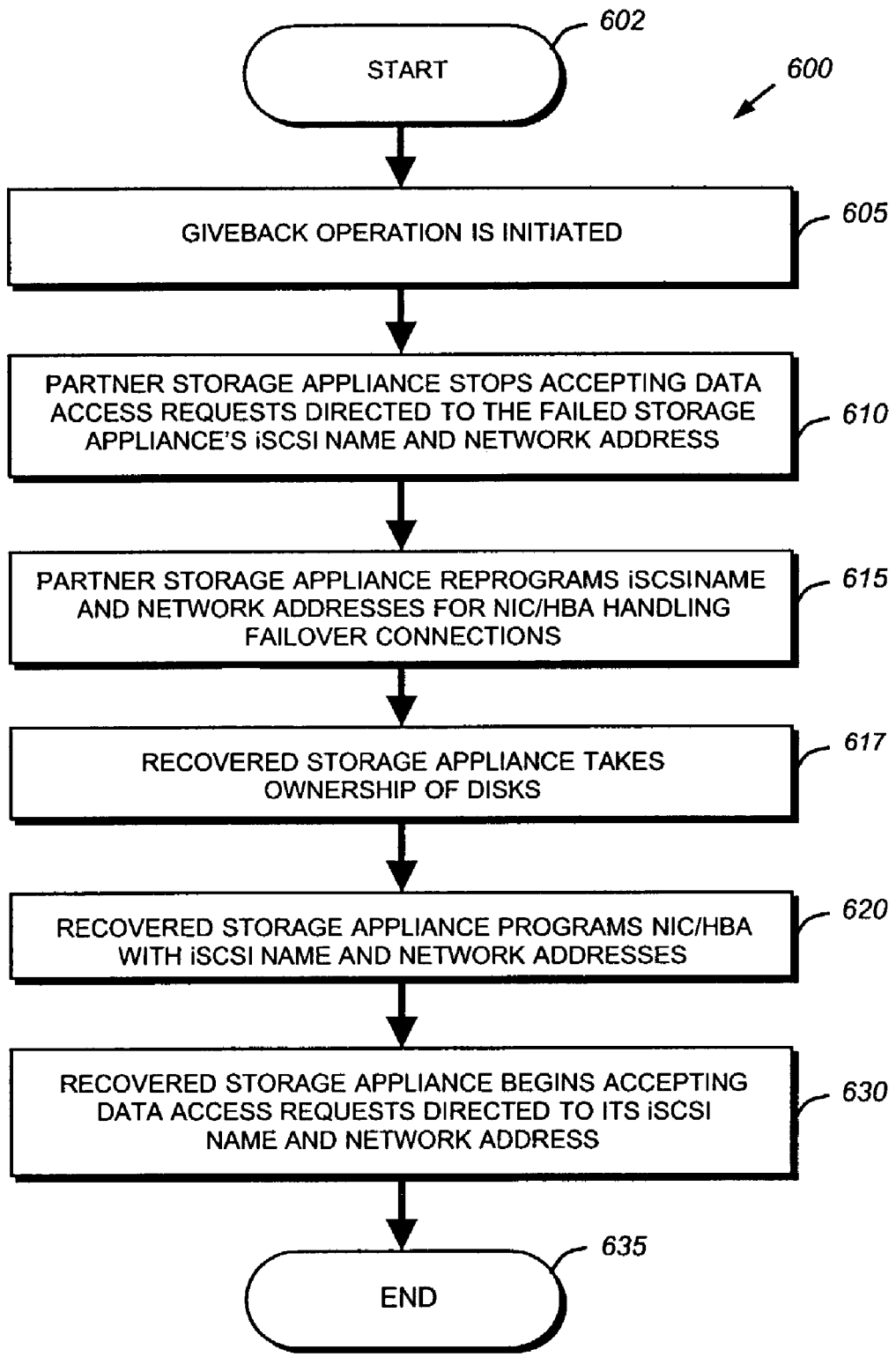
FIG. 6 is a flowchart detailing the steps of a procedure performed during a giveback operation in accordance with an embodiment of the present invention.

Once the failure or other error condition has been corrected, an administrator or user may cause the partner storage appliance to execute a giveback operation to transfer control of the disks that were taken over by the partner storage appliance back to the now-functional failed storage appliance. A flowchart of a sequence of steps of an exemplary giveback procedure 600 is shown in FIG. 6. The procedure 600 begins at step 602 and proceeds to step 605, where the giveback operation is initiated. This initiation can be accomplished by an administrator or user of the system entering a command in, for example, a command line interface or by selecting an option in a graphical user interface that is operatively interconnected with the storage appliance and storage operating system. In an alternate embodiment, the recovered failed storage appliance can alert the partner storage appliance that a giveback command should be initiated.

In response to the initialization of the giveback procedure, the partner storage appliance, in step 610, stops servicing requests directed to any ports that were configured in a failover procedure to handle requests previously directed to the failed storage appliance. After the partner storage appliance stops servicing requests directed to ports configured as failed storage appliance ports, the partner storage appliance then reprograms each iSCSI name and network address for the NIC handling data access requests directed to the failed storage appliance's iSCSI name and network address (step 615). In the illustrative embodiment, this reprogramming occurs by deactivating the port or NIC/HBA associated with these requests. However, in alternate embodiments, the iSCSI name and network address may be reset to a standby value that is not associated with the failed storage appliance.

Then, in step 617, the recovered storage appliance takes ownership of the appropriate set of disks that the surviving storage appliance had previously taken ownership thereof. The recovered storage appliance can utilize the same method as described above in obtaining ownership over the set of disks. Next, in step 620, the recovered storage appliance programs its NIC/HBA with the appropriate iSCSI name and network address. This may occur, for example, during a rebooting or other reinitialization of the failed storage appliance. Finally, in step 630, the recovered storage appliance begins accepting data access requests directed to its iSCSI name and network address. At this point, the recovered storage appliance is functioning as it was just prior to the error or failure condition which resulted in the failover operation. However, due to the failover operation, all data access requests received during the time that the failed storage appliance was inoperative, are handled by the surviving partner storage appliance. Thus, to clients of the recovered storage appliance, it appears as it the storage appliance was momentarily disconnected from the network. The procedure then ends at step 635.

To again summarize, in the event of a failure or other error condition of a storage appliance in a cluster configuration, the surviving storage appliance assumes the identify of the failed storage appliance and begins servicing block access requests directed to the failed storage appliance. The surviving storage appliance assumes the identity of the failed storage appliance by activating a network interface controller (NIC) and programming the NIC with a network address associated with the failed storage appliance. The assumption of the identity of the failed storage appliance is achieved by the surviving storage appliance mapping a network address normally associated with the failed storage appliance to a NIC on the surviving partner storage appliance. The surviving storage appliance also maps the failed storage appliances iSCSI name to the port associated with the failed storage appliance's network address. Thus, to the other devices on the TCP/IP network, it appears as if the surviving partner storage appliance is the failed storage appliance. Once the surviving storage appliance has assumed the identity of the failed storage appliance, then the partner storage appliance takes ownership of the disks normally owned by the failed storage appliance server. In the illustrative embodiment, this disk ownership allows the partner storage appliance to write to the disks.

Once the surviving storage appliance has assumed the network identity of the failed storage appliance and taken control and ownership of the disks associated with the failed storage appliance, then the surviving storage appliance can begin processing data access requests directed to the network address and iSCSI name associated with the failed storage appliance. In the illustrative embodiment, the surviving storage appliance has a copy of the LUN mappings associated with the failed storage appliance, thereby allowing the surviving storage appliance to properly apply LUN maskings/mappings as if it were the failed storage appliance.

The surviving partner storage appliance will continue to process data access requests until a give back operation is performed. In accordance with the illustrative embodiment, a user or administrator must execute a give back command, either through a command line interface or via a graphical user interface. However, it should be noted that in alternate embodiments an automatic give back operation may be performed, by, for example, the failed storage appliance sending a message to the partner storage appliance.

The foregoing description has been directed to specific embodiments of this invention. It will be apparent, however, that other variations and modifications may be made to the described embodiments, with the attainment of some or all of their advantages. Specifically, it should be noted that any number of NIC/HBAs may be utilized in accordance with the invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for a first storage appliance to provide data access service operations performed by a second storage appliance after the second storage appliance suffers an error condition, comprising:

operatively interconnecting the first and second storage appliances with a set of clients, the clients communicating with the first and second storage appliances using a block access protocol, being an iSCSI protocol, over a TCP/IP network;

detecting, by the first storage appliance, that the second storage appliance has suffered an error condition;

activating, on the first storage appliance, a network interface controller, the network interface controller being adapted to have a network address normally associated with the second storage appliance by identifying each media access control address associated with the second storage appliance and assigning a network interface controller connected to the first storage appliance, a media access control address that was normally associated with a network interface controller on the second storage appliance;

associating, by the first storage appliance, an iSCSI name that is globally unique name associated with the entire second storage appliance and not with one or more network interfaces of the second storage appliance, by an iSCSI driver on the first storage appliance being programmed to associate the appropriate iSCSI name of the second storage appliance with such iSCSI requests that are directed to the second storage appliance;

assuming, by the first storage appliance, ownership of a set of disks associated with the second storage appliance; and processing at said first storage appliance data access requests directed to the iSCSI name and network address of the second storage appliance, while the first storage appliance also continues to process data access requests directed to said first storage appliance.

2. A method for a first storage appliance to provide data access service operations performed by a second storage appliance after the second storage appliance suffers an error condition, comprising:

operatively interconnecting the first and second storage appliances with a set of clients, the clients communicating with the first and second storage appliances using a block access protocol over a TCP/IP network;

detecting, by the first storage appliance, that the second storage appliance has suffered an error condition;

activating, on the first storage appliance, a network interface, the network interface being adapted to have a network address normally associated with the second storage appliance;

assuming, by the first storage appliance, an iSCSI name that is a globally unique name associated with the entire second storage appliance and not with one or more network interfaces of the second storage appliance, by an iSCSI driver on the first storage appliance being programmed to associate the appropriate iSCSI name of the second storage appliance with such iSCSI requests that are directed to the second storage appliance;

assuming, by the first storage appliance, ownership of a set of disks associated with the second storage appliance; and processing, at said first storage appliance, such data access requests directed to the network address and iSCSI name of the second storage appliance and using LUN mapping and LUN masking associated with the second storage appliance, while said first storage appliance continues to process data access requests that were directed to said first storage appliance using the respective LUN mapping and LUN masking of the first storage appliance in processing such requests.

3. The method of claim 1 wherein the step of detecting that the second storage appliance has suffered an error condition further comprises detecting a lack of a heart beat signal from the second storage appliance.

4. The method of claim 1 wherein the step of detecting that the second storage appliance has suffered an error condition further comprises a user entering a failover command.

5. The method of claim 1 wherein the network interface further comprises network interface controller.

6. The method of claim 1 wherein the network address further comprises a Transport Control Protocol/Internet Protocol address.

7. The method of claim 1 wherein the step of assuming an iSCSI name associated with the second storage appliance further comprises programming the network interface with the iSCSI name.

8. A method for performing a failover operation by configuring a first storage appliance to provide data access service operations performed by a second storage appliance, comprising:

operatively interconnecting the first and second storage appliances with a set of clients, the clients communicating with the first and second storage appliances using a block access protocol over a TCP/IP network;

initiating a failover operation;

performing at the first storage appliance:

activating a network interface adapted to respond to a network address normally associated with the second storage appliance;

assigning, to the network interface that is adapted to respond to said network address associated with the second storage appliance, an iSCSI name associated with the second storage appliance, wherein the iSCSI name is a globally unique name associated with the entire second storage appliance and not with one or more network interfaces of the second storage appliance, by an iSCSI driver on the first storage appliance being programmed to associate the appropriate iSCSI name of the second storage appliance with such iSCSI requests that are directed to the second storage appliance;

assuming, by the first storage appliance ownership of a set of disks associated with the second storage appliance; and processing, by the first storage appliance, data access requests directed to the network address and iSCSI name from the set of clients.

9. The method of claim 8 wherein the step of initiating a failover operation further comprises detecting an error condition of the second storage appliance.

10. The method of claim 8 wherein the step of initiating a failover operation further comprises entering a failover command by a user.

11. The method of claim 8 wherein the step of activating a network interface adapted to respond to a network address associated with the second storage appliance further comprises programming the network address into the network interface.

12. The method of claim 8 wherein the step of processing, by the first storage appliance, data access requests directed to the network address and the iSCSI name further comprises using the LUN mapping and LUN masking associated with the second storage appliance.

13. A computer readable medium containing executable program instructions executed by a processor, comprising:

program instructions that operatively interconnect a first and a second storage appliance with a set of clients, the clients communicating with the first and second storage appliances using a block access protocol, being an iSCSI protocol, over a TCP/IP network;

program instructions that detect, by the first storage appliance, that the second storage appliance has suffered an error condition;

program instructions that activate, on the first storage appliance, a network interface controller, the network interface controller being adapted to have a network address normally associated with the second storage appliance by identifying each media access control address associated with the second storage appliance and assigning a network interface controller connected to the first storage appliance, a media access control address that was normally associated with a network interface controller on the second storage appliance; and program instructions that assume, by the first storage appliance, an iSCSI name associated with the second storage appliance, wherein the iSCSI name is a globally unique name associated with the entire second storage appliance and not with one or more network interfaces of the second storage appliance;

program instructions to assume, by the first storage appliance, ownership of a set of disks associated with the second storage appliance; and program instructions that process at said first storage appliance data access requests directed to the iSCSI name and network address of the second storage appliance, while the first storage appliance also continues to process data access requests directed to said first storage appliance over one or more remaining network interface controllers that were originally assigned to said first storage appliance.

14. A system for a first storage appliance to provide data access service operations performed by a second storage appliance after the second storage appliance suffers an error condition, the system comprising:

means for operatively interconnecting the first and second storage appliances with a set of clients, the clients communicating with the first and second storage appliances using a block access protocol over a TCP/IP network;

means for detecting, by the first storage appliance, that the second storage appliance has suffered an error condition;

means for activating, on the first storage appliance, a network interface, the network interface being adapted to have a network address associated with the second storage appliance said means for activating including means for identifying each media access control address associated with the second storage appliance and assigning a network interface controller connected to the first storage appliance, a media access control address that was normally associated with a network interface controller on the second storage appliance and means for assuming, by the first storage appliance, an iSCSI name that is a globally unique name associated with the entire second storage appliance and not with one or more network interfaces of the second storage appliance, by an iSCSI driver on the first storage appliance being programmed to associate the appropriate iSCSI name of the second storage appliance with such iSCSI requests that are directed to the second storage appliance; means for using LUN mapping and LUN masking associated with the second storage appliance, wherein the iSCSI name is associated with the entire second storage appliance and not with one or more network interfaces of the second storage appliance.

15. A system for a first storage appliance to provide data access service operations performed by a second storage appliance after the second storage appliance suffers an error condition, the system comprising:

the first and second storage appliances operatively interconnected with a set of clients, the clients communicating with the first and second storage appliances using a block access protocol over a TCP/IP network;

the first storage appliance configured to detect an error condition that the second storage appliance has suffered;

a network interface on the first storage appliance, the network interface configured to have a network address normally associated with the second storage appliance; and the first storage appliance further configured to assume an iSCSI name that is a globally unique name associated with the entire second storage appliance and not with one or more network interfaces of the second storage appliance, by an iSCSI driver on the first storage appliance being programmed to associate the appropriate iSCSI name of the second storage appliance with such iSCSI requests that are directed to the second storage appliance using a LUN mapping and LUN masking associated with the second storage appliance; and the first storage appliance being further configured to process data access requests directed to the first and second storage appliances.

16. A cluster environment, comprising:

operatively interconnecting a first and second storage appliance with a set of clients, the clients communicating with the first and second storage appliances using a block access protocol over a TCP/IP network;

the first storage appliance configured to detect an error condition that the second storage appliance has suffered;

a network interface on the first storage appliance, the network interface configured to have a network address normally associated with the second storage appliance; and the first storage appliance further configured to assume an iSCSI name that is a globally unique name associated with the entire second storage appliance and not with one or more network interfaces of the second storage appliance, by an iSCSI driver on the first storage appliance being programmed to associate the appropriate iSCSI name of the second storage appliance with such iSCSI requests that are directed to the second appliance using a LUN mapping and LUN masking associated with the second storage appliance; and the first storage appliance being further configured to process data access requests directed to the first and second storage appliances, whereby the first storage appliance processes data access requests directed by clients to both storage appliances in the cluster.

17. The cluster environment of claim 16, further comprises:

a heart beat signal connected between the first storage appliance and the second storage appliance for detecting the failure.

18. The method of claim 16, further comprising:

assuming, by the first storage appliance, ownership of the second set of disks.

19. A method for a first storage appliance to provide data access service operations performed by a second storage appliance after the second storage appliance suffers an error condition, comprising:

operatively interconnecting the first and second storage appliances with a set of clients, the clients communicating with the first and second storage appliances using a block access protocol over an Ethernet network;

detecting, by the first storage appliance, that the second storage appliance has suffered an error condition;

activating, on the first storage appliance, a network interface, the network interface being adapted to have a network address normally associated with the second storage appliance; and_assuming, by the first storage appliance, an iSCSI name associated with the entire second storage appliance said first storage appliance further assuming the iSCSI name of the second storage appliance as an iSCSI driver on the first storage appliance is programmed to associate the appropriate iSCSI name of the second storage appliance with such iSCSI requests that are directed to the second storage appliance, and the first storage appliance processing said iSCSI requests of the second storage appliance while continuing to process data access requests that were originally directed to said first storage appliance, said first storage appliance assuming ownership of a set of disks associated with the second storage appliance.

* * * * *